United States Patent
Yoneda et al.

(10) Patent No.: US 8,862,281 B2
(45) Date of Patent: Oct. 14, 2014

(54) ELECTRIC POWER DISTRIBUTION SYSTEM

(75) Inventors: Satsuki Yoneda, Osaka (JP); Shinichi Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 37 days.

(21) Appl. No.: 13/500,156

(22) PCT Filed: Oct. 1, 2010

(86) PCT No.: PCT/IB2010/002492
§ 371 (c)(1),
(2), (4) Date: May 8, 2012

(87) PCT Pub. No.: WO2011/042787
PCT Pub. Date: Apr. 14, 2011

(65) Prior Publication Data
US 2012/0271474 A1    Oct. 25, 2012

(30) Foreign Application Priority Data
Oct. 5, 2009   (JP) .................................. 2009-232016

(51) Int. Cl.
*G06F 1/26*     (2006.01)
*H02J 13/00*    (2006.01)

(52) U.S. Cl.
CPC .................................. *H02J 13/0079* (2013.01)
USPC .............................. 700/295; 700/286; 702/62

(58) Field of Classification Search
USPC .................. 700/22, 286, 295; 702/60, 61, 62; 705/412
See application file for complete search history.

(56) References Cited

U.S. PATENT DOCUMENTS

| 6,512,966 | B2 * | 1/2003 | Lof et al. ....................... 700/291 |
| 6,583,521 | B1 * | 6/2003 | Lagod et al. ..................... 307/70 |
| 6,671,585 | B2 * | 12/2003 | Lof et al. ..................... 705/36 R |
| 7,430,534 | B2 * | 9/2008 | Lof et al. ......................... 705/37 |
| 7,430,545 | B2 * | 9/2008 | Kanbara et al. ................ 705/412 |
| 7,444,189 | B1 * | 10/2008 | Marhoefer ....................... 700/26 |
| 8,019,445 | B2 * | 9/2011 | Marhoefer ....................... 700/26 |
| 8,103,465 | B2 * | 1/2012 | Brzezowski et al. ........... 702/62 |

(Continued)

FOREIGN PATENT DOCUMENTS

| JP | 2002-44870 | 2/2002 |
| JP | 2003-309929 | 10/2003 |

(Continued)

OTHER PUBLICATIONS

International Search Report for corresponding International Application No. PCT/IB2010/002492 mailed Feb. 1, 2011.

(Continued)

*Primary Examiner* — Charles Kasenge
(74) *Attorney, Agent, or Firm* — Renner, Otto Boisselle & Sklar, LLP

(57) ABSTRACT

A power distribution system includes: a remote electricity monitoring device which is provided at each power supply destination, and remotely reads, via communication means, an consumed power amount and an surplus power amount stored in a power storage device at each supply destination; and a management server which manages the power supply of each supply destination while collecting, via the communication means, the consumed power information and the surplus power information, both of which are read by the remote electricity monitoring device. The management server distributes the power among the supply destinations in line with the relationship between the power amounts based on the consumed power information and surplus power information.

20 Claims, 12 Drawing Sheets

(56) References Cited

U.S. PATENT DOCUMENTS

| | | | |
|---|---|---|---|
| 8,156,055 B2* | 4/2012 | Shimada et al. | 706/12 |
| 8,170,886 B2* | 5/2012 | Luff | 705/1.1 |
| 8,234,876 B2* | 8/2012 | Parsonnet et al. | 62/59 |
| 8,352,084 B2* | 1/2013 | Tomita et al. | 700/276 |
| 8,378,835 B2* | 2/2013 | Shin et al. | 340/635 |
| 2002/0087234 A1* | 7/2002 | Lof et al. | 700/286 |
| 2002/0103745 A1* | 8/2002 | Lof et al. | 705/37 |
| 2002/0194113 A1* | 12/2002 | Lof et al. | 705/37 |
| 2003/0006613 A1* | 1/2003 | Lof et al. | 290/44 |
| 2003/0078797 A1* | 4/2003 | Kanbara et al. | 705/1 |
| 2003/0126060 A1* | 7/2003 | Lof et al. | 705/36 |
| 2005/0127680 A1* | 6/2005 | Lof et al. | 290/44 |
| 2007/0271006 A1* | 11/2007 | Golden et al. | 700/295 |
| 2007/0276547 A1* | 11/2007 | Miller | 700/295 |
| 2008/0281663 A1* | 11/2008 | Hakim et al. | 705/8 |
| 2009/0048716 A1* | 2/2009 | Marhoefer | 700/291 |
| 2009/0088991 A1* | 4/2009 | Brzezowski et al. | 702/62 |
| 2009/0093916 A1* | 4/2009 | Parsonnet et al. | 700/286 |
| 2010/0023174 A1 | 1/2010 | Nagata et al. | |
| 2010/0049371 A1* | 2/2010 | Martin | 700/291 |
| 2010/0217642 A1* | 8/2010 | Crubtree et al. | 705/8 |
| 2011/0106327 A1* | 5/2011 | Zhou et al. | 700/291 |

FOREIGN PATENT DOCUMENTS

| | | |
|---|---|---|
| JP | 2004-273316 | 9/2004 |
| JP | 2005-70869 | 3/2005 |
| JP | 2009-189239 | 8/2009 |
| WO | 2008/117392 | 10/2008 |

OTHER PUBLICATIONS

Form PCT/ISA/237 for corresponding International Application No. PCT/IB2010/002492 dated Feb. 1, 2011.

* cited by examiner

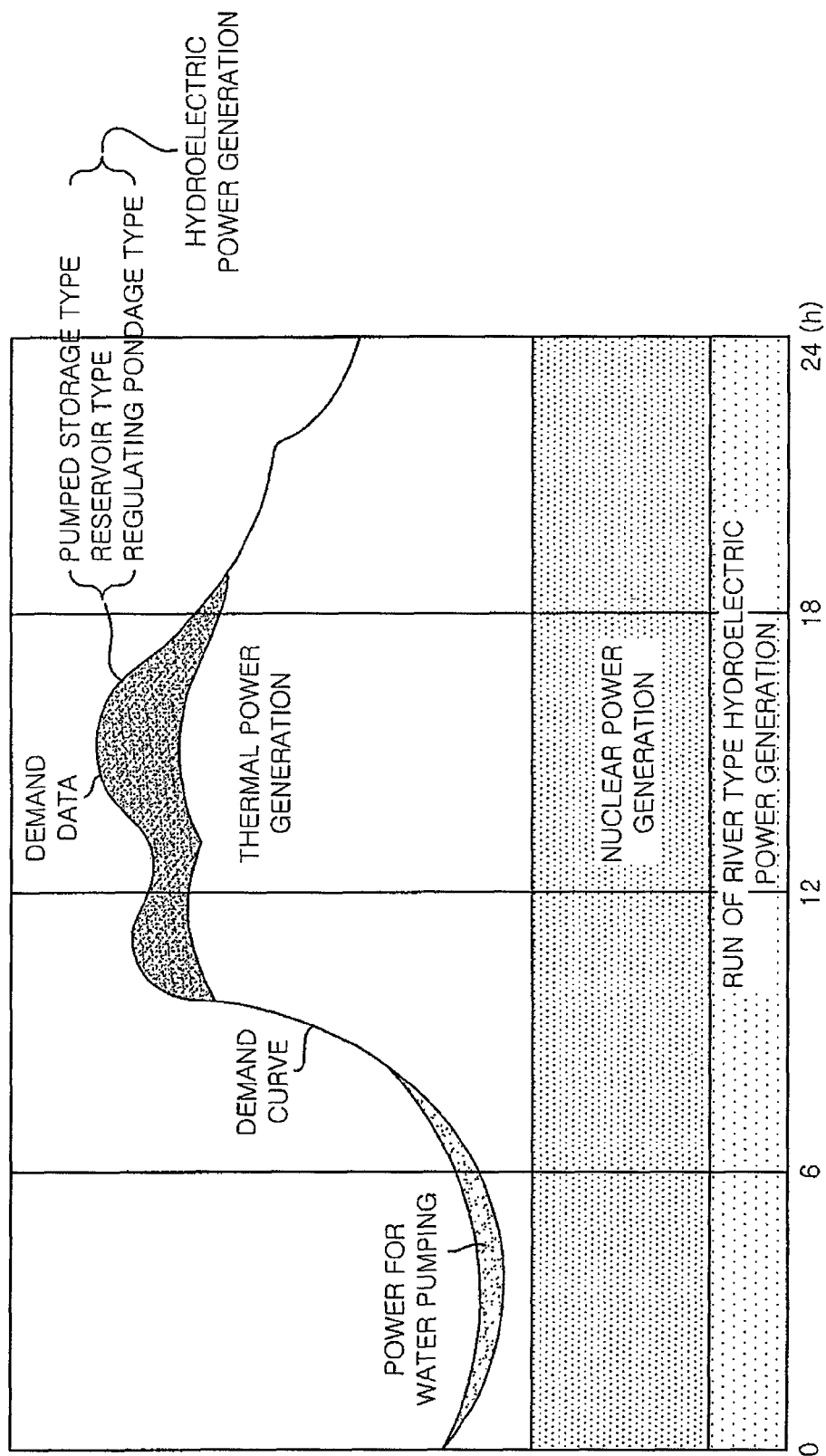

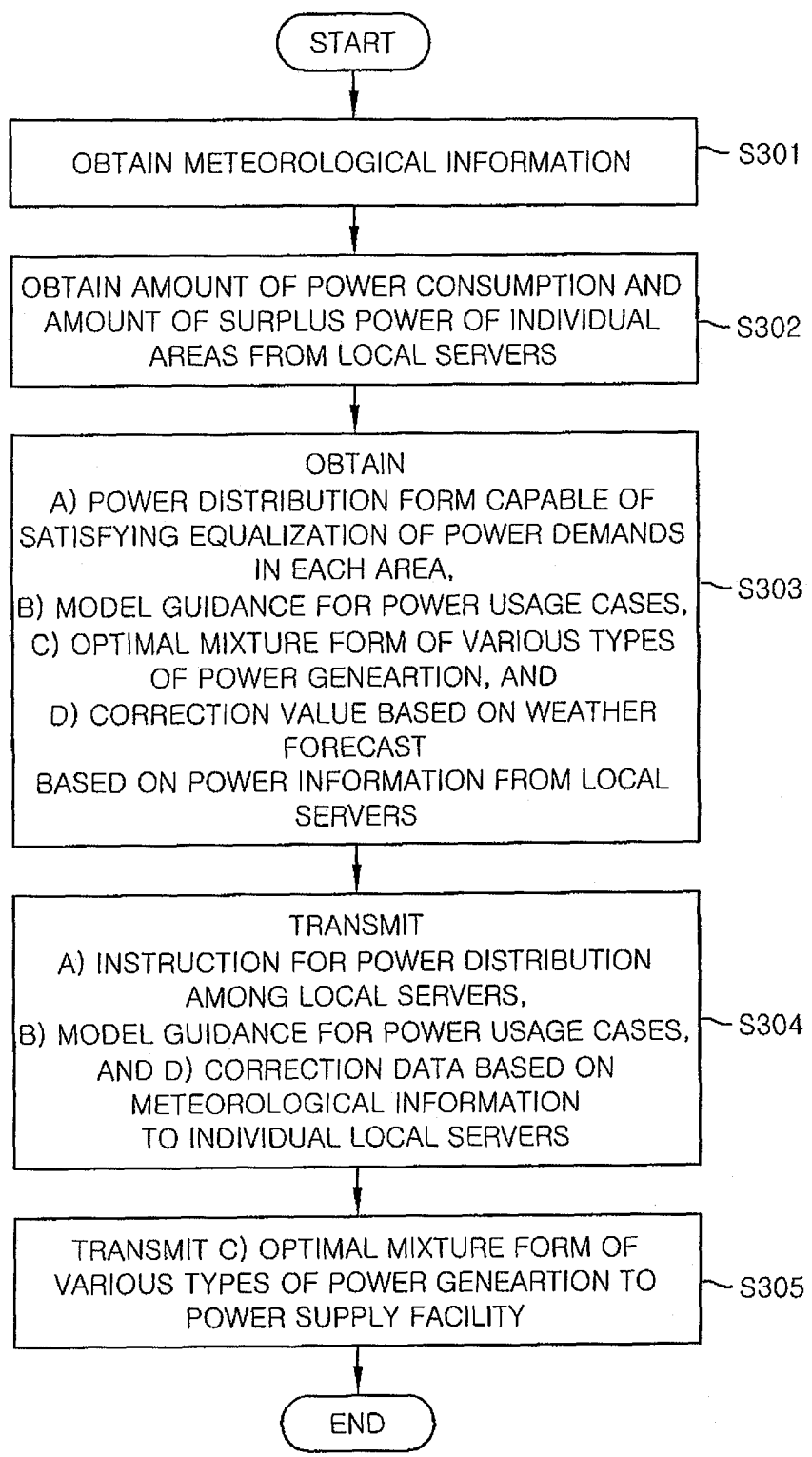

ELECTRIC POWER DISTRIBUTION SYSTEM

FIELD OF THE INVENTION

The present invention relates to a power distribution system for distributing a power supplied to dwellings or the like by using remote electricity monitoring devices installed in the dwellings or the like.

BACKGROUND OF THE INVENTION

Conventionally, Japanese Patent Application Publication No. 2005-070869 discloses a remote electricity monitoring device. That is, with this device, a register displaying accumulated electricity consumption and a rotating disc of an induction type watt-hour meter previously installed are imaged by an imaging unit. Then, through the pattern recognition on respective obtained images, the accumulated electricity consumption displayed on the register and accumulated electricity consumption estimated from the rotation of the rotating disc are obtained, so that the accumulated electricity consumption of the induction type watt-hour meter can be monitored based on the obtained accumulated electricity consumption. Further, the monitored accumulated electricity consumption of the induction type watt-hour meter is transmitted to an electricity metering center via a communication device.

With such remote electricity monitoring device, accumulated electricity consumption is automatically read from a watt-hour meter provided in each dwelling via a communication device so that the accumulated electricity consumption of a power supplied to each dwelling can be easily obtained.

SUMMARY OF THE INVENTION

However, an amount of a power consumed in a dwelling, i.e., a power consumption amount, which is measured by the remote electricity monitoring device, is typically different for each dwelling, region, season, time period, or the like. Accordingly, various types of information on power consumption patterns of each dwelling, each region or the like can be obtained based on the power consumption amount obtained therefrom. However, although installation of a remote electricity monitoring device in each dwelling or region is completed, it cannot be a basic solution for facilitating the effective use of a power. That is, there is a demand or a requirement for the efficient supply of a power to a supply destination, but the mechanism thereof has not yet been established.

In view of the above, the present invention provides a power distribution system capable of achieving a power supply which satisfies power demands of power supply destinations by distributing a power depending on excess or deficiency of a power among the individual power supply destinations.

In accordance with an aspect of the present invention, there is provided a power distribution system including: a remote electricity monitoring device which is provided in each of supply destinations of a power for remotely measuring an amount of power consumption of each supply destination and an amount of a surplus power stored in a storage battery in the supply destination via communication means; and a management server for managing supply of the power to each supply destination while collecting power consumption amount information and surplus power amount information, which are information obtained by the remote electricity monitoring devices, via the communication means.

The management server, distributes the power among the supply destinations in line with a relationship between power amounts based on the power consumption amount information and the surplus power amount information that have been collected.

In accordance with the above configuration, when the amount of power consumption and the amount of surplus power of each power supply destination, the supply of power of which is managed under the control of a management server, are collected in the management server via the communication means in the remote electricity monitoring device, the management server can collectively manage the amount of power consumption and the amount of surplus power of each power supply destination such as a dwelling, a factory, a facility or the like. Further, when a power is distributed among power supply destinations in line with a relationship between the amounts of power based on the amount of power consumption and the amount of surplus power of each power supply destination, which have been collectively managed in this way, that is, the relationship between the excess and deficiency of the amount of power of each power supply destination, the excess and deficiency of power among the power supply destinations are resolved in such a way that a supply destination having a surplus power distributes the power to a supply destination experiencing power deficiency due to its excessive power consumption. Accordingly, power demands among power supply destinations are satisfied.

The communication means preferably employs power line communications using a power line as a medium.

In accordance with the above configuration, when PLC (Power Line Communications) using a power line for supplying power to each supply destination as a medium is employed as the communication means, there is no need to ensure a separate communications path for remotely measuring the amount of power consumption and the amount of surplus power, and a private network using an existing wiring path can be constructed. Further, since the power line communications, which uses a power line for supplying power to each supply destination as a medium, is employed as the communication means as described above, management is facilitated when a power that is supplied to each power supply destination through the power line, and the power consumption amount information and the surplus power amount information that are collected through the power line, are managed by the management server.

The communication means may employ network communications using Internet as a medium.

In accordance with the above configuration, when network communication using the Internet as a medium is employed as the communication means, network communications having high generality can be implemented and the range of application thereof can be extended in the case where the amount of power consumption and the amount of surplus power of each supply destination are collected in the management server by the remote electricity monitoring device.

The management server preferably performs power distribution among the supply destinations depending on a balance of power amounts based on the power consumption amount information and the surplus power amount information.

The power demands of the power supply destinations vary in relation to a balance between the amounts of power based on the amount of power consumption and the amount of surplus power of each power supply destination. That is, even when the amount of power consumption of a power supply destination is excessively high, if a power to supplement the amount of power consumption is stored, the balance between the amount of power consumption and the amount of surplus power exists. Therefore, the power demand is satisfied in the power supply destination, and thus, there is no need to perform power distribution.

In this regard, according to the configuration, power distribution among the supply destinations is performed depending on a balance between the amounts of power based on the amount of power consumption and the amount of surplus power of each power supply destination. Accordingly, when the power demands in the supply destinations is satisfied by means of power distribution among the power supply destinations, the equalization of power demands among the supply destinations is achieved. Accordingly, power distribution among the supply destinations can be appropriately performed.

The management server preferably distributes the surplus power to a supply destination expected to experience power deficiency, based on changes in the power consumption amount information and the surplus power amount information.

In general, the amount of power consumption or the amount of surplus power changes depending on each dwelling or each area, and in addition, on each season, each time period and the like. A supply destination having power deficiency can be previously determined based on the changes in the amount of power consumption and the amount of surplus power. In accordance with the above configuration, when the surplus power is distributed and supplied to a supply destination which is expected to experience power deficiency on the basis of the changes in the amount of power consumption and the amount of surplus power, the distribution of power is performed before the power deficiency occurs on the supply destination, thus preventing the power deficiency from occurring.

The management server may primarily distribute the surplus power to a supply destination that is previously determined among the supply destinations.

In accordance with the above configuration, when the supply destination having higher power consumption among the power supply destinations is previously determined by a contract or the like, and a surplus power is primarily supplied to the determined supply destination, power distribution among the supply destinations can be accurately and easily performed.

The supply destination that is previously determined is a supply destination having a small change in power consumption.

The power supply destinations includes supply destinations having a small change in the amount of power consumption and a supply destinations such as a dwelling, the power consumption of which greatly changes depending on the time period or environmental conditions such as meteorological conditions. In this regard, when surplus power is distributed and supplied to a supply destination having a small change in the amount of power consumption, the power required by this supply destination can be detected with high precision. Accordingly, a sufficient surplus power can be distributed and supplied to a supply destination requiring the surplus power, and in addition, power distribution among the supply destinations can be performed with high reliability.

The supply destination that is previously determined is a supply destination having a small change in power consumption and having a fixed period of time in power consumption.

As described above, the power demand is almost fixed in the case of a supply destination having a small change in the amount of power consumption and having a fixed period of time in power consumption, so that the amount of surplus power required can be detected with high precision for performing power distribution. In this regard, when a supply destination having a small change in the amount of power consumption and the fixed period of time in power consumption is designated as a supply destination to which the surplus power is to be supplied, as described above, the power required by the supply destination can be detected with high precision. Accordingly, a sufficient surplus power can be distributed and supplied to the supply destination requiring the surplus power, and moreover, power distribution among the supply destinations can be performed with high reliability.

The supply destination may be an electrically driving system of a public institution.

Generally, the system having a small change in the amount of power consumption includes an electrically driving system of a public institution such as a streetlight, an incinerator or the like, and a change in the amount of power consumption thereof is generally fixed. Due thereto, in accordance with the above configuration, when the distribution of power is performed based on the comparison between the amount of surplus power collected in the management server for a power distribution destination and a demand for power required to operate the system of the public institution, a sufficient power can be definitely supplied to the system.

The supply destination may be an antitheft security system provided in a building.

The security system is generally operated at a specific time due to constant power consumption. Due thereto, it is also possible to predict the amount of surplus power required or a time period requiring the surplus power with high precision, for the security system. In this regard, in accordance with the above configuration, a sufficient surplus power can be securely distributed and supplied during the required time span period for supplying the surplus power to the security system.

The management server may further include a function of calculating an optimal mixture form of various types of power generation in a power supply facility, based on the power consumption amount information and the surplus power amount information, and feed back the calculated optimal mixture form of the various types of the power generation to the power supply facility.

In accordance with the above configuration, when the optimal mixture form of various types of power generated from thermal power generation, hydroelectric power generation, nuclear power generation or the like is calculated from each aspect such as stability, economic efficiency, or environmental efficiency, on the basis of the collected power consumption amount information and surplus power amount information, the power demand in which the amounts of power consumption and the amounts of surplus power of supply destinations in an area managed by the management server are taken into consideration can be accurately obtained. Accordingly, a highly reliable optimal mixture form of various types of power generation depending on the power demand can be fed back to a power supply facility, and, in addition, power can be efficiently supplied to the supply destinations.

A reduction in discharge of carbon dioxide may be taken into consideration in the calculation of the optimal mixture form of the various types of the power generation.

In accordance with the above configuration, when a reduction in the discharge of carbon dioxide is taken into consideration in the optimal mixture form of various types of power generation, environmental efficiency in the supply of power can be further improved while a power is generated by the power supply facility based on the optimal mixture form.

A reduction in power generation cost is taken into consideration in the calculation of the optimal mixture form of the various types of the power generation.

In accordance with the above configuration, when a reduction in the discharge of carbon dioxide is taken into consideration in the optimal mixture form of various types of power generation, economic efficiency in the supply of power can be further improved when power is generated by the power supply facility based on the optimal mixture form.

The management server may further include a function of obtaining information required to improve power utilization efficiency of each supply destination, based on the power consumption amount information and the surplus power amount information, and providing guidance of the obtained information via the communication means, and each supply destination further includes a reporting unit for reporting the guidance through the remote electricity monitoring device.

In general, the value of power supplied differs depending on a time period for which power is supplied or the amount of power supplied, and the efficiency of power utilization also changes in relation to the time period for which power is supplied or the amount of power supplied. In accordance with the above configuration, when information required to increase the power utilization efficiency is obtained based on the collected power consumption amount information and surplus power amount information, and the obtained information is reported to the user of the supply destination via a display device or a voice guidance device, the efficiency of power utilization in each supply destination is improved.

The management server may further include a function of receiving environmental information including meteorological information via the communication means and correcting a distribution form of the power distribution based on the received environmental information.

The amount of power consumption or the amount of surplus power of the power supply destination changes in relation to environmental conditions, e.g., meteorological conditions such as weather or atmospheric temperature, or political factors. In accordance with the above configuration, a distribution form of the power distribution is corrected based on the environmental information, thus enabling power distribution to be performed with higher reliability.

The management server may include a plurality of servers implemented in a hierarchical structure in which functions are assigned to corresponding levels, the remote electricity monitoring device installed in each of the supply destinations may be connected to a relevant server at a lowermost level among the hierarchical servers via the communication means, and the power consumption amount information and the surplus power amount information, which are information obtained by the remote electricity monitoring device, may be collected in the server at the lowermost level, so that whenever a limitation caused in power distribution by a lower-level server, targets for power distribution are sequentially changed to supply destinations managed by the server at a higher level.

In accordance with the above configuration, when the management server includes a plurality of servers implemented in a hierarchical structure in which functions are assigned to respective levels, the power consumption amount information and the surplus power amount information of individual supply destinations that form a minimum group (area) unit are collected in each server at the lowermost level of the hierarchical structure. Further, the power consumption amount information and surplus power amount information of a minimum group unit collected in each lowermost level server are managed by a management server at a level higher than the lowermost level. Accordingly, the power consumption amount information and the surplus power amount information of individual power supply destinations are collected by stages in the units of, e.g., a pole transformer or the office of an electric power company. The management of the power consumption amount information and the surplus power amount information for each group (area), and even power distribution based on the power consumption amount information and the surplus power amount information, are also facilitated.

Further, in regard to such power distribution, whenever power distribution by a lower-level server is restricted, targets for power distribution are sequentially changed to supply destinations that are managed by a higher-level server. That is, in regard to power distribution among the power supply destinations, power distribution is primarily performed based the power consumption amount information and surplus power amount information in minimum groups (areas) managed by each server at the lowermost level, and power demands is satisfied for each of the minimum areas. Further, when excess or deficiency of power of each supply destination are not resolved although power distribution among supply destinations in the area has been performed based on the amount of power consumption and the amount of surplus power, power distribution among the minimum areas (groups) is performed by higher level servers. Accordingly, self-satisfaction for power demands can be achieved by stages over a range from a minimum area (group) unit such as between neighboring dwellings to a large group unit such as a district. Moreover, a mechanism capable of efficiently supplying a power to each supply destination can also be easily established.

The server at the lowermost level is a sub-management server and is installed at a pole transformer.

In general, under a pole transformer, five to ten dwellings or the like are present as power supply destinations, so that dwellings supplied with power from this pole transformer are called a minimum group for power distribution. Accordingly, micro-power distribution can be performed among the five to ten dwellings as each unit that is supplied with power from the pole transformer, and power transmission loss is suitably reduced upon efficiently supplying power to each supply destination. Further, when the sub-management server is installed on the pole transformer in this way, management is facilitated in the case where the supply of power to each dwelling and both the power consumption amount information and the surplus power amount information are managed by the sub-management server.

A local server for managing supply of the power to an area to which the supply destinations are assigned is preferably installed as a server at a level higher than that of the sub-management server installed at the pole transformer, and the power distribution among the supply destinations may be performed in units of the area.

In accordance with the above configuration, when the local server for managing the supply of power to an area in which supply destinations are assigned is provided as the server at a level higher than that of the sub-management server installed on the pole transformer, and the distribution of power among the individual supply destinations is performed in the units of the area managed by the local server, the power distribution can take place among areas, each forming a group of pole transformers, as well as power distribution between individual pole transformers at the level lower than that of the local server. Accordingly, power demands among the areas can be satisfied when power distribution among the supply destinations is performed by the hierarchical servers.

In accordance with the power distribution system of the present invention, the supply of power can be fulfilled to satisfies power demands in power supply destinations via power distribution based on the excess and deficiency of power among the power supply destinations.

BRIEF DESCRIPTION OF THE DRAWINGS

The objects and features of the present invention will become apparent from the following description of embodiments, given in conjunction with the accompanying drawings, in which:

FIG. 6 is a graph showing a mixture form of various types of power generation by a power supply facility depending on power demands;

FIG. 9 is a flowchart showing a sequence of power distribution by a center server in accordance with the embodiment of the present invention.

DETAILED DESCRIPTION OF THE EMBODIMENTS

Figure 1:
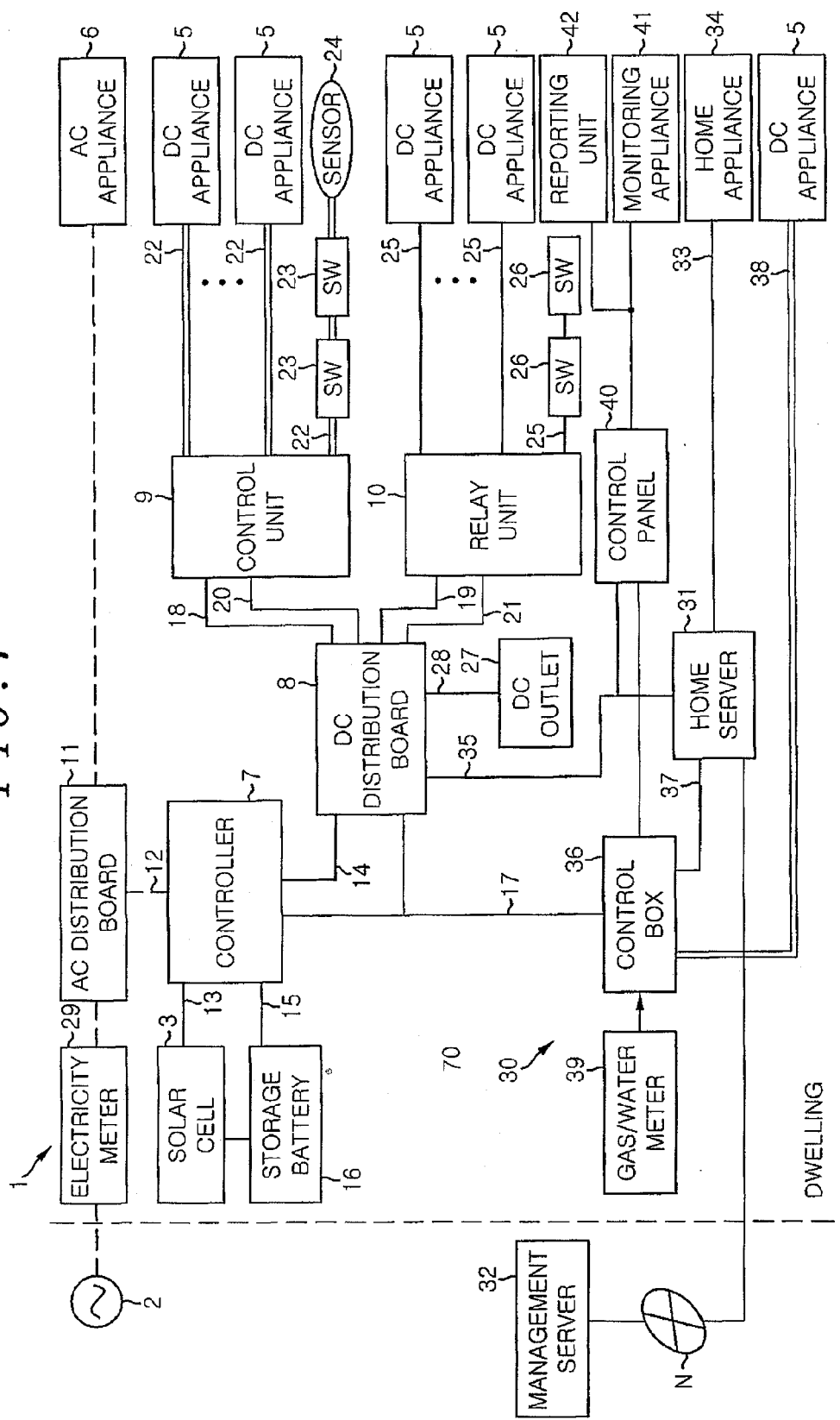
FIG. 1 is a block diagram showing the configuration of a power supply system to which a power distribution system in accordance with the present invention is applied.

Hereinafter, embodiments of the present invention will be described with reference to the accompanying drawings which form a part hereof. The same reference numerals will be assigned to the same or similar components throughout the drawings, and redundant descriptions thereof will be omitted.

As shown in FIG. 1, in a dwelling as a power supply destination, a power supply system 1 for supplying a power to various types of appliances installed at home (illumination devices, air conditioners, electric home appliances, audio and visual appliances or the like) is provided. The power supply system 1 supplies not only a power from a commercial AC (Alternating Current) power source 2 (AC power source) for home use but also a power from a solar cell 3 which generates a power by using solar light, to various types of appliances. The power supply system 1 supplies a power to an AC appliance 6 configured to receive the AC power from the commercial power source (AC power source) and be operated, in addition to DC (Direct Current) appliances 5 configured to receive DC power from a DC power source to and be operated.

The power supply system 1 is provided with a controller 7 and a DC distribution board 8 (including a DC breaker) as a distribution board of the system 1. Further, the power supply system 1 is provided with a control unit 9 and a relay unit 10 for controlling the operations of the DC appliances 5 of the dwelling.

An AC distribution board 11 for branching an AC power is connected to the controller 7 via an AC power line 12. The controller is connected to the commercial AC power source 2 via the AC distribution board 11 and is connected to the solar cell 3 via a DC power line 13. The controller receives an AC power from the AC distribution board 11, receives a DC power from the solar cell 3 and converts the powers into a predetermined DC power as an appliance power. Further, the controller outputs the resulting DC power to the DC distribution board 8 via a DC power line 14 or outputs it to a storage battery 16 as a power storage device via a DC power line 15 to store the power in the storage battery 16.

The storage battery 16 is used as, e.g., a backup power source for a case of power failure or the like. Further, in the storage battery 16, a surplus power of the power generated by the solar cell 3 is stored. The controller receives the AC power and also supplies an AC power to the AC distribution board 11 by converting the power from the solar cell 3 or the power from the storage battery 16 into the AC power. The controller exchanges data with the DC distribution board 8 via a signal line 17.

The DC distribution board 8 is a kind of breaker for a DC power. The DC distribution board 8 branches the DC power inputted from the controller and outputs the resulting DC power to the control unit 9 via a DC power line 18, or to the relay unit 10 via a DC power line 19. Further, the DC distribution board 8 exchanges data with the control unit 9 via a signal line 20 or with the relay unit 10 via a signal line 21.

The multiple DC appliances 5 are connected to the control unit 9. These DC appliances 5 are connected to the control unit 9 via DC supply lines 22, each of which is capable of carrying both the DC power and data via the same wiring. The DC supply lines 22 carry both power and data to the respective DC appliances 5 over a single wire through communications that superimpose, on a DC power, communications signals transmitting data via a high-frequency transmission wave, i.e., a power for the DC appliances. The control unit 9 obtains the DC power of the DC appliances 5 via the DC power line 18, and determines which of the DC appliances 5 is to be controlled and which method is to be used to control the DC appliance 5, based on operating instructions obtained from the DC distribution board 8 via the signal line 20. Moreover, the control unit 9 outputs the DC power and the operating instructions to the determined DC appliance 5 over the DC supply line 22 to control the operation of the DC appliance 5.

Switches 23 that are manipulated when the operations of the household DC appliances 5 are switched are connected to the control unit 9 via the DC supply line 22. Further, a sensor 24 for detecting, e.g., radio waves transmitted from an infrared remote controller, is connected to the control unit 9 via the DC supply line 22. Accordingly, the DC appliances 5 are controlled by transmitting communications signals over the DC supply line 22 in response not only to the operating instruction from the DC distribution board 8 but also to the manipulation of the switches 23 or the detection of the sensor 24.

Multiple DC appliances 5 are connected to the relay unit 10 via respective DC power lines 25. The relay unit 10 obtains the DC power of the DC appliances 5 via the DC power line 19 and determines which of the DC appliances 5 is to be operated based on an operating instruction obtained from the DC distribution board 8 via the signal line 21. Then, the relay unit 10 controls the operation of the determined DC appliance 5 in such a way that a relay provided therein selectively starts or stops the supply of the DC power to the DC power line 25. Moreover, multiple switches 26 for manually manipulating the DC appliances 5 are connected to the relay unit 10, and thus, the DC appliances 5 are controlled by selectively starting or stopping the supply of the DC power over the DC power line 25 using the relay in response to the manipulation of the switches 26.

A DC outlet 27 that is properly attached to the dwelling, e.g., in a form of a wall outlet or a bottom outlet, is connected to the DC distribution board 8 via the DC power line 28. When the plug (not shown) of the DC appliance is inserted into the DC outlet 27, a DC power is directly supplied to the appliance.

Further, an electricity meter 29, as a remote electricity monitoring device capable of remotely measuring the amount of the consumed power of the commercial AC power source 2 (i.e., the amount of power consumption) or the amount of surplus power that is generated by the solar cell and is stored in the storage battery 16, is connected between the commercial AC power source 2 and the AC distribution board 11. The electricity meter 29 has a function of, e.g., power line communications or wireless communications, as well as the function of remotely measuring the amount of power consumption or the amount of surplus power. The electricity meter 29 collects the amount of the power consumption and the amount of the surplus power of each supply destination via power line communications or wireless communications and transmits them to the center server (not shown) in a power provider such as an electric power company which manages the supply of power to the supply destination. Such a center server obtains information required to improve the power utilization efficiency of each supply destination based on the power consumption amount information and the surplus power amount information transmitted from the electricity meter 29, and transmits the obtained information to the electricity meter 29 provided in each dwelling.

The power supply system 1 is provided with a network system 30 that enables various types of household appliances to be controlled via network communications. The network system 30 is provided with a home server 31 that functions as a controller of the network system 30. The home server 31 is connected to an external home management server 32 via a network N, such as Internet and is also connected to a home appliance 34 via a signal line 33. Further, the home server 31 operates by a DC power, obtained from the DC distribution board 8 via the DC power line 35.

A control box 36 for managing the operational control of various types of the home appliances through network communications is connected to the home server 31 via a signal line 37. The control box 36 is connected to the controller and the DC distribution board 8 via the signal line 17 and may also directly control the DC appliances 5 via a DC supply line 38. A gas/water meter 39 capable of remotely measuring, e.g., the amounts of gas or water used is connected to the control box 36 which is in turn connected to a control panel 40 of the network system 30. A monitoring device 41 including, e.g., a door phone receiver, a sensor or a camera is connected to the control panel 40. Further, a reporting unit 42 including a display device or a voice guidance device for reporting various information received via the electricity meter 29 to the resident of the dwelling is connected to the control panel 40.

As information reported by the reporting unit 42, model cases for a power usage pattern, such as an appropriate usage example of each appliance for a power rate per each hour, is guided. For example, when the resident of the dwelling uses the washing machine once at each of 9 a.m. and once at 18 p.m., the model case is reported as "it is profitable to use twice a washing machine at 18 p.m. to reduce a power rate". Further, in regard to the selling of surplus power generated by the solar cell 3 or the like, model cases for a power selling pattern appropriate for the resident is guided.

When instructions to operate the various types of the home appliances are inputted through the network N, the home server 31 notifies the control box 36 of the instructions, and operates the control box 36 so that the appliances perform operations corresponding to the operating instructions. Further, the home server 31 provides various types of information, which is obtained from the gas/water meter 39, to the home management server 32 via the network N, and, upon receiving notification that the monitoring device 41 has detected an abnormality from the control panel 40, also provides the notification to the home management server 32 via the network N.

According to the power supply system 1, the operations of various types of the appliances installed at the home can be collectively managed by the home server 31, and powers can be efficiently supplied to those appliances. Further, required powers to be used by various types of appliances can be supplemented with a surplus power such as the power generated by a power generation device at the home including the solar cell 3 or the like, or the power stored in the storage battery 16, and thus power demands at the home can be satisfied.

However, a balance between the amount of power consumption and the amount of surplus power in the power supply destination varies depending on each dwelling, each area, environmental conditions such as meteorological conditions, or time spans. Because of this, when the amount of a power consumed at the home becomes excessively high, it is difficult to supply a power depending on the power demand at the home, and a deficiency of power occurs.

Meanwhile, compared to the amount of the power consumed by various types of appliances, when the amount of the power generated by the power generation device such as the solar cell 3 or the amount of power stored in the storage battery 16 increases, the amount of the surplus power at the home increases. In this way, even if a power demand has been satisfied in a single dwelling (supply destination), it is difficult to maintain a balance between the amount of the power consumption and the amount of the surplus power and to resolve the excess and deficiency of a power among individual dwellings.

Therefore, in the present embodiment, the distribution of a power among power supply destinations is performed based on a balance between the power consumption amount information and the surplus power amount information of each power supply destination. The schematic configuration of the power distribution system in accordance with the present embodiment is shown in FIG. 2.

Figure 2:
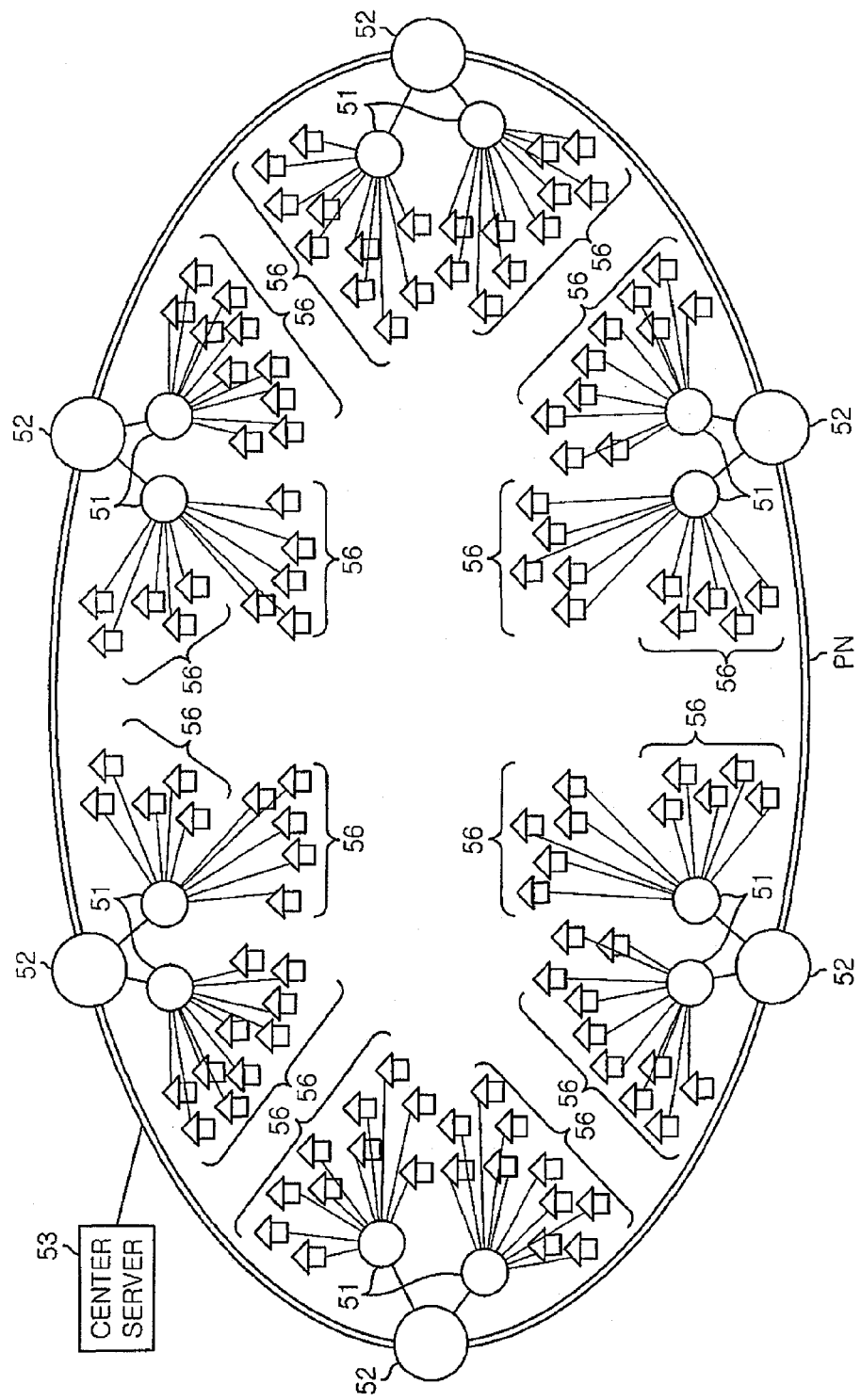
FIG. 2 is a diagram illustrating a configuration of the power distribution system in accordance with an embodiment of the present invention.

As shown in FIG. 2, the power supply system includes a management server for collecting the amounts of the power consumption and the amounts of the surplus power measured by the electricity meters 29 provided in respective dwellings 56, i.e., power supply destinations while managing a supply of a power to the supply destinations.

Figure 3:
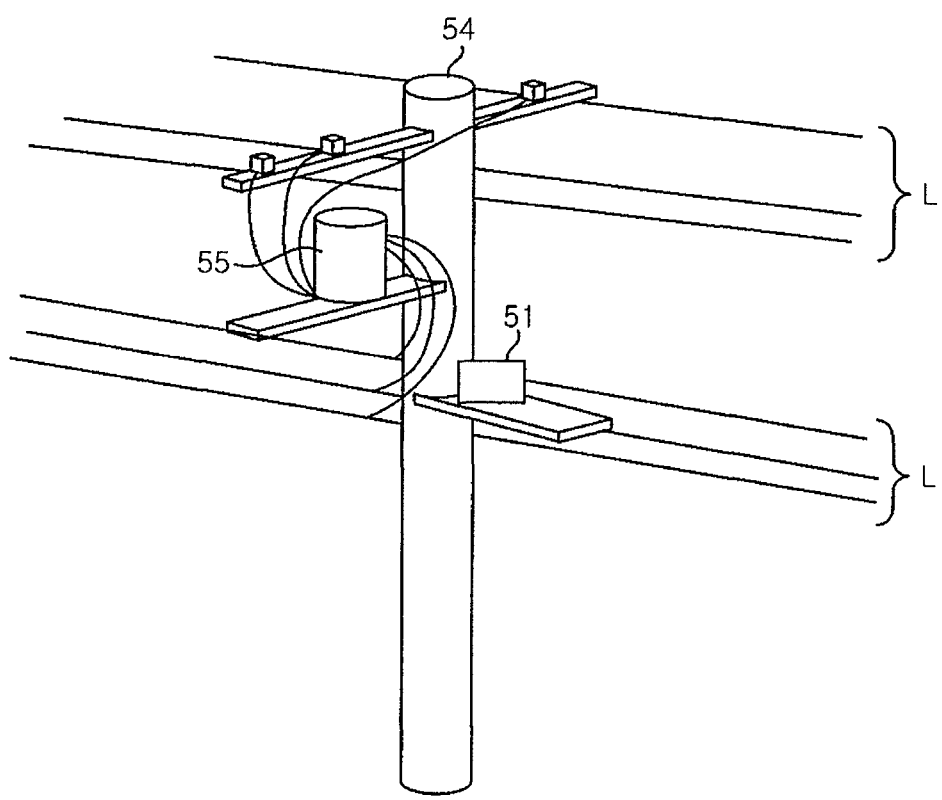
FIG. 3 is a diagram illustrating an installation form of a sub-management server in accordance with the embodiment of the present invention.
Figure 4:
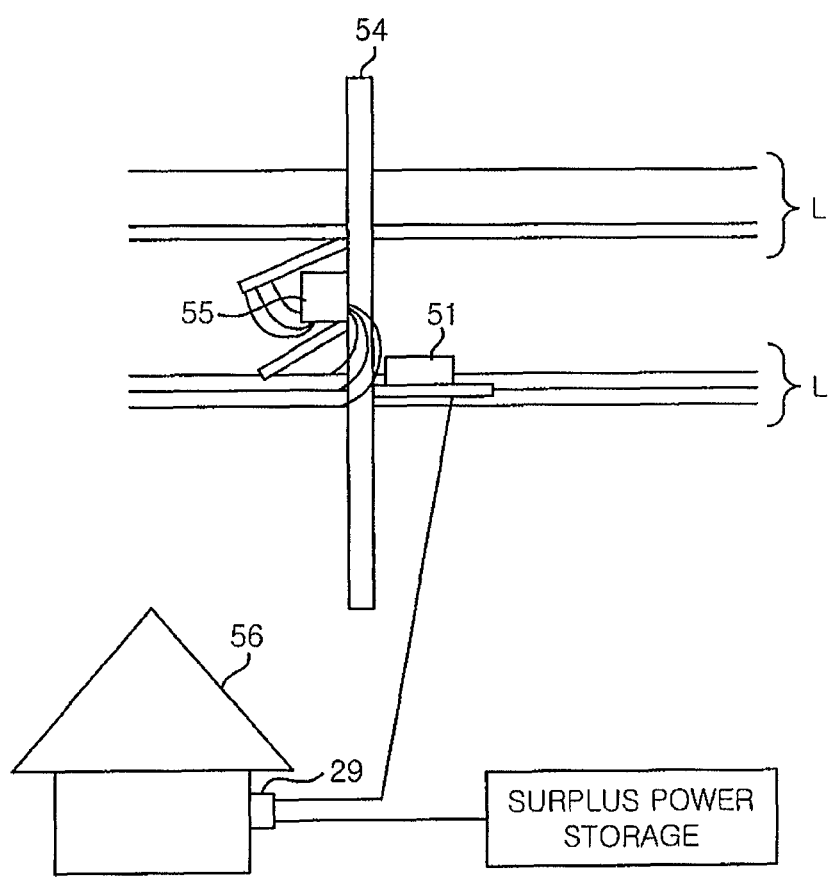
FIG. 4 is a diagram illustrating a form of a connection between an electricity meter and a the sub-management server in accordance with the embodiment of the present invention.

The management server includes a plurality of servers 51 to 53 implemented in a hierarchical structure in which functions are assigned to respective levels. Among the servers 51 to 53, each server 51 at the lowermost level is a sub-management server and is installed together with a pole transformer 55 installed on an electric pole 54, as shown in FIG. 3. Under the sub-management server 51 and the pole transformer 55, about five to ten dwellings or the like are present as supply destinations to which a power from a power supply facility is supplied from the pole transformer 55 via power lines L. Further, in each of the dwellings, the electricity meter 29 is provided, as shown in FIG. 4, so that the amount of the power consumption and the amount of the surplus power in each of the dwellings 56 are measured by the electricity meter 29. The power consumption amount information and the surplus power amount information of each supply destination 56 measured by the electricity meter 29 in this way are collected in the sub-management server 51 through power line communications over the power lines L.

Accordingly, the individual dwellings 56 supplied with a power from the power supply facility via the pole transformer 55 are set as a minimum group unit, so that power consumption amount information and surplus power amount information within the group are collected in the sub-management server 51. Further, the supply of power from the pole transformer 55 to each dwelling 56 is managed by the sub-management server 51 in consideration of a balance between the amounts of the consumed power and the surplus power based on the power consumption amount information and the surplus power amount information of the dwellings 56.

In a local server 52 provided at the higher level, an area in which several tens of supply destinations, i.e., the dwellings 56 belonging to a group of adjacent multiple pole transformers 55 are present is set as a unit, so that power consumption amount information and surplus power amount information of individual supply destinations located in the area are collected in the local server 52 through power line communications over the power lines L. Further, as the unit of the area managed by the local server 52, an area based on the unit of each business office of an electric power company, e.g., is set.

In this way, the local server 52 manages the power consumption amount information and the surplus power amount information of each supply destination present in the area based on a unit of the pole transformers 55 while managing the supply of the power to each pole transformer 55 in consideration of the balance between the amounts of the consumed power and the surplus power based on the power consumption amount information and the surplus power amount information from the respective pole transformers 55. Further, the local server 52 provided in each area is connected to the network PN of a power provider, i.e., the electric power company or the like, so that a network for dividing targets, to which a power from the power supply facility is to be supplied, into multiple areas and separately managing the divided targets is constructed.

Further, the center server 53 is located at the level higher than that of the local servers 52 provided corresponding to the multiple areas and is configured to collectively manage the local servers 52. In the center server 53, the power consumption amount information and the surplus power amount information of the supply destinations managed by individual local servers 52 are managed on the basis of the areas, and the supply of the power to each area is managed in consideration of a balance between the amounts of the consumed power and the surplus power based on the power consumption amount information and the surplus power amount information in each area. Accordingly, the power consumption amount information and the surplus power amount information of the individual supply destinations divided in the multiple areas are collectively managed by the center server 53.

Further, the amount of power consumption and the amount of surplus power also change depending on environmental conditions including meteorological conditions or the like. That is, the amount of the power generated by the solar cell 3 is proportional to the amount of sunshine, and the amount of the power generated is also decreased during the night time or in bad weather. Further, the frequency of use of an air-conditioning appliance, such as an air-conditioner or the like, varies depending on a change in atmospheric temperature, humidity, weather and the like, and thus the amount of power consumption also changes.

In the present embodiment, meteorological information such as weather forecast information of each area, e.g., rainfall probability, the amount of solar radiation, the amount of clouds, temperature and humidity, is obtained by the center server 53 from an information institution such as the meteorological administration, and correction data is obtained based on the obtained meteorological information of each area. Further, the amount of the surplus power to be distributed among the dwellings 56a to 56e (see FIG. 5) based on the balance between the amount of the power consumption and the amount of the surplus power is corrected by using the obtained correction data.

That is, when worsening weather, for example, is forecasted based on the meteorological information obtained by the center server 53, the reduction in the amount of power generated by the solar cell 3 is predicted, and thus the amount of surplus power to be distributed from an area, which generates a large amount of power by the solar cell 3, is corrected to be reduced. Further, even in an area having power deficiency, when an increase in the amount of power generated from the area is predicted due to an increase in the amount of solar radiation, the amount of surplus power to be distributed to that area is corrected to be reduced.

Furthermore, in an area which is forecasted to have a thunder (thunderbolt), the amount of surplus power to be distributed and supplied is corrected to be an amount of a power for compensating a power failure caused by the falling of a thunderbolt. In this way, in the present embodiment, a form of power distribution among the supply destinations is corrected based on the weather forecast for each supply destination, thus enabling power distribution to be performed depending on the variation in meteorological conditions.

Next, the form of the power distribution performed by the power distribution system configured in this way is described with reference to FIG. 5. Further, each of the dwellings 56a to 56e shown in FIG. 5 is assumed to have the power supply system 1 of FIG. 1.

Figure 5:
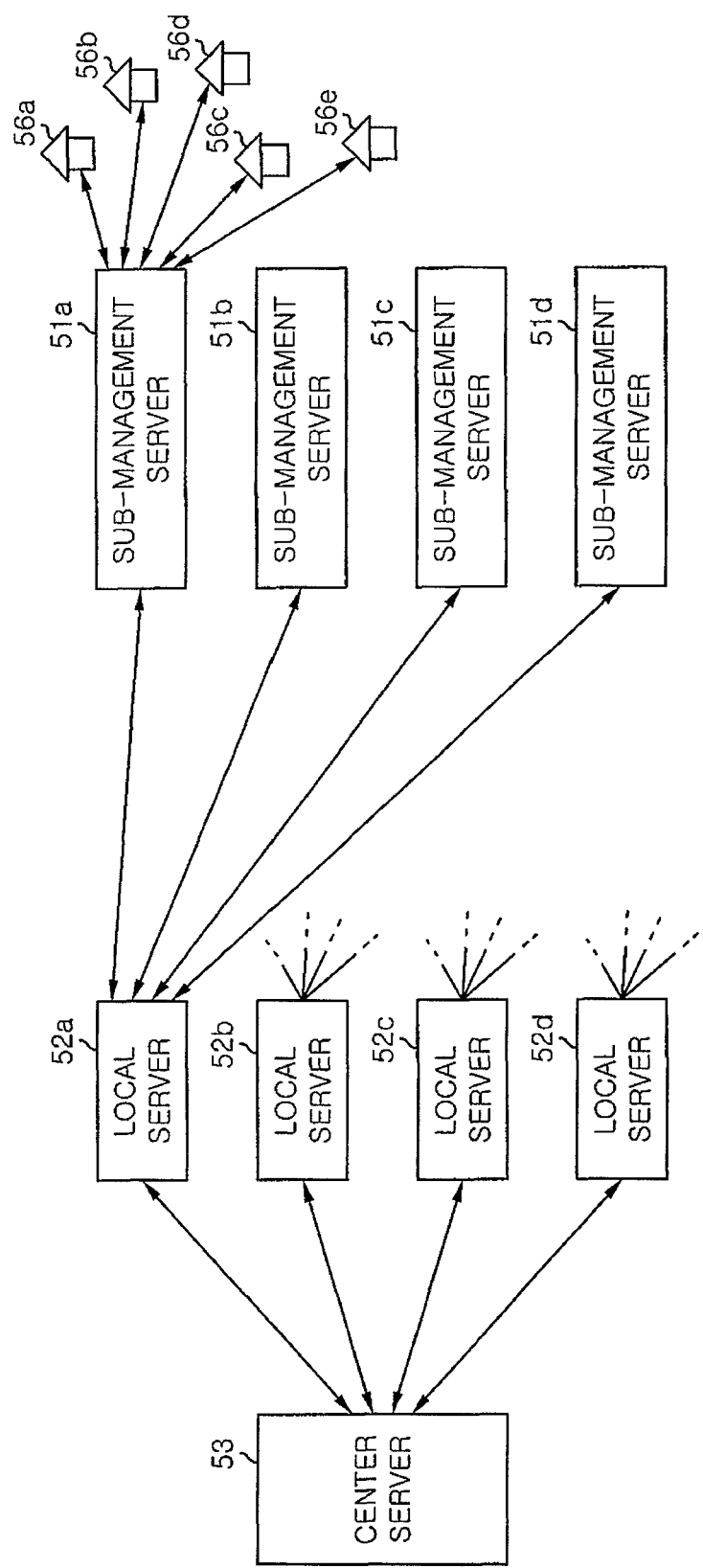
FIG. 5 is a block diagram showing a hierarchical structure of individual servers in accordance with the embodiment of the present invention.

As shown in FIG. 5, the management server forming the power distribution system is implemented in a tree-shaped hierarchical structure based on the sub-management servers 51, the local servers 52, and the center server 53 which are hierarchically arranged by stages. The scale of groups (areas) of supply destinations in which the form of power supply is managed is expanded in the sequence of sub-management servers 51→local servers 52→center server 53.

Under the above assumption, power consumption amount information and surplus power amount information of dwellings 56a to 56e, which are measured by electricity meters 29 provided in the respective dwellings 56a to 56e to be managed under the pole transformer 55, or the amounts of deficient power of the dwellings 56a to 56e, are collected in a sub-management server 51a at the lowermost level among the hierarchical servers. Correction data based on the meteorological information obtained by the center server 53 is delivered to the sub-management server 51 via the local server 52.

Further, among the sub-management server 51a and the electricity meters 29 provided in the dwellings 56a to 56e, as shown in FIG. 6, a power is primarily purchased during a time period for nighttime power set by an electric power company, i.e., a time period in which power demands are reduced (1 kwh=about 9 yen), and the power is sold up to the maximum amount of surplus power within a range previously determined by the electric power company. Further, in relation to the power selling of the surplus power, first, power selling is requested by the electricity meters 29 provided in the dwellings 56a to 56e to the sub-management server 51a, and thereafter notification of the determination of an amount of the power to be purchased in response to the power selling request is provided from the sub-management server 51a to each electricity meter 29.

Further, changes in amounts of power consumption and amounts of surplus power of individual dwellings 56a to 56e are learned by the sub-management server 51a on the basis of the amounts of the power consumption and the amounts of the surplus power of the dwellings 56a to 56e collected by the electricity meters 29. Furthermore, power usage pattern models or power selling pattern models of the dwellings 56a to 56e are transmitted to the electricity meters 29 provided in the dwellings 56a to 56e on the basis of the changes in the amounts of the power consumption and the amounts of the surplus power of the dwellings 56a to 56e. In this way, in the dwellings 56a to 56e, the power usage pattern models or the power selling pattern models are guided to the residents of the dwellings 56a to 56e via the reporting unit 42 that reports guidance through the electricity meters 29 (remote meter-reading devices).

On the basis of a balance between the amounts of the consumed power and the surplus power based on the power consumption amount information and the surplus power amount information of the dwellings 56a to 56e collected in the sub-management server 51a, e.g., when the dwellings 56a and 56b are expected to experience power deficiency, the surplus power of the dwellings 56c to 56e is distributed and supplied to the dwellings 56a and 56b. Further, in this case, the amount of the surplus power to be distributed from the dwellings 56c to 56e to the dwellings 56a and 56b which are expected to experience the power deficiency is corrected depending on the correction data based on the meteorological information. That is, in regard to this correction, correction is performed to reduce the amount of surplus power to be distributed from the dwellings 56c to 56e, e.g., when the amount of power generated by the solar batteries 3 in the dwellings 56a and 56b, which has been expected to experience a deficiency of power, is predicted to increase with an increase in the amount of solar radiation on the basis of meteorological information.

If such surplus power to satisfy the power demand has been supplied to the dwellings 56a and 56b via the distribution and supply of the surplus power to the dwellings 56a and 56b performed in this way, information on a balance between the amounts of the power consumption and the amounts of the surplus power in the management area is transmitted from the sub-management server 51a to the local server 52 located at the higher level. In this way, in the present embodiment, self-satisfaction for the power demand in the area managed by the sub-management server 51a is achieved via the distribution and supply of surplus power performed among the dwellings 56a to 56e depending on the amounts of power consumption and the amounts of surplus power of the dwellings 56a to 56e.

Meanwhile, if it is difficult to resolve the excess or deficiency of power in the management area via the distribution and supply of the surplus power among the dwellings 56a to 56e, notification indicating the situation is transmitted from the sub-management server 51a to the higher level-local server 52a. Similarly, in the local server 52a, the balance information or the amounts of deficient power, which are obtained in the area to be managed based on the unit of the pole transformer 55, are collected from the sub-management servers 51b to 51d.

When the balance information or the amounts of the deficient power of the area to be managed are collected in the local server 52a in this way, it is determined based on the collected information whether a balance among the respective pole transformers 55 managed by the sub-management servers 51a to 51d has been preserved, i.e., whether the excess or the deficiency of power has not occurred. Further, when, e.g., it is assumed that a deficiency of a power is predicted for the area managed by the sub-management server 51b, and a surplus power is present in the area managed by the sub-management server 51c, a power distribution instruction prompting the surplus power of the area managed by the sub-management server 51c to be distributed and supplied to the area managed by the sub-management server 51b is issued from the local server 52a to the sub-management server 51c. Further, even in this case, the amount of the surplus power to be distributed is corrected depending on correction data based on the meteorological information.

Moreover, when such surplus power to satisfy the power demand is supplied to the area managed by the sub-management server 51b through the distribution and supply of the surplus power among the areas managed by the local server 52a, self-satisfaction for the power demand in the areas managed by the local server 52a is achieved, and then the power information on the areas managed by the local server 52a is transmitted to the center server 53. Similarly, information on the balance between the amounts of power consumption and the amounts of surplus power, the amounts of deficient power and the like for the respective areas managed by the local servers 52b to 52d are collected in the center server 53.

In this way, when the balance information or the amounts of deficient power for the areas managed by the local servers 52a to 52d are collected in the center server in this way, it is determined based on the collected information whether a balance among the areas managed by the local servers 52a to 52d has been preserved, i.e., whether the excess or deficiency of power has not occurred. For example, when it is assumed that a deficiency of a power is predicted for the area managed by the local server 52b, and a surplus power is present in the area managed by the local server 52c, the center server 53 issues a power distribution instruction, prompting the surplus power of the area managed by the local server 52c to be distributed and supplied to the area managed by the local server 52b, to the local server 52c. Further, even in this case, the amount of the surplus power to be distributed is corrected depending on correction data based on the meteorological information. As described above, a power demand in each of the areas managed by the respective local servers 52a to 52d is satisfied through distribution of a surplus power among those areas.

Meanwhile, if self-satisfaction for a power demand in each area is not achieved in spite of the distribution of the surplus power among the areas, information on an amount of supply power, which is derived to satisfy the power demand in each area on the basis of the balance information or the amounts of deficient power of the individual areas, is collected in the center server 53. Then, the information on the supply power amount is transmitted to the power supply facility.

Further, in addition to the information on the supply power amount, the center server 53 calculates an optimal mixture form of powers of various types that have been generated by, e.g., thermal power generation, hydroelectric power generation, and nuclear power generation in the power supply facility, on the basis of the power consumption amount information and the surplus power amount information of the respective areas. In the optimal mixture form, a reduction in the discharge of carbon dioxide, a reduction in power generation cost, and importance exerted on nuclear power generation are taken into consideration, so that a mixture form that is suitable for each aspect such as environmental efficiency, economic efficiency, or stability is calculated.

As described above, in the present embodiment, the excess or the deficiency of a power are resolved via power distribution performed by stages in a micro area based on the unit of the pole transformer 55. Due thereto, a path for surplus power distribution can be set to the shortest distance upon performing power distribution based on the amount of power consumption and the amount of surplus power of each supply destination. Accordingly, self-satisfaction for power demands among the supply destinations and among the areas can be achieved while power transmission loss is appropriately reduced in the distribution and the supply of the surplus power.

Hereinafter, a sequence of the distribution of a surplus power performed by the sub-management server 51, the local server 52, and the center server 53 will be described with reference to FIGS. 7 to 9. FIGS. 7 to 9 illustrate the sequences of the distribution of the surplus power performed by the sub-management server 51, the local server 52 and the center server 53, respectively.

Figure 7A:
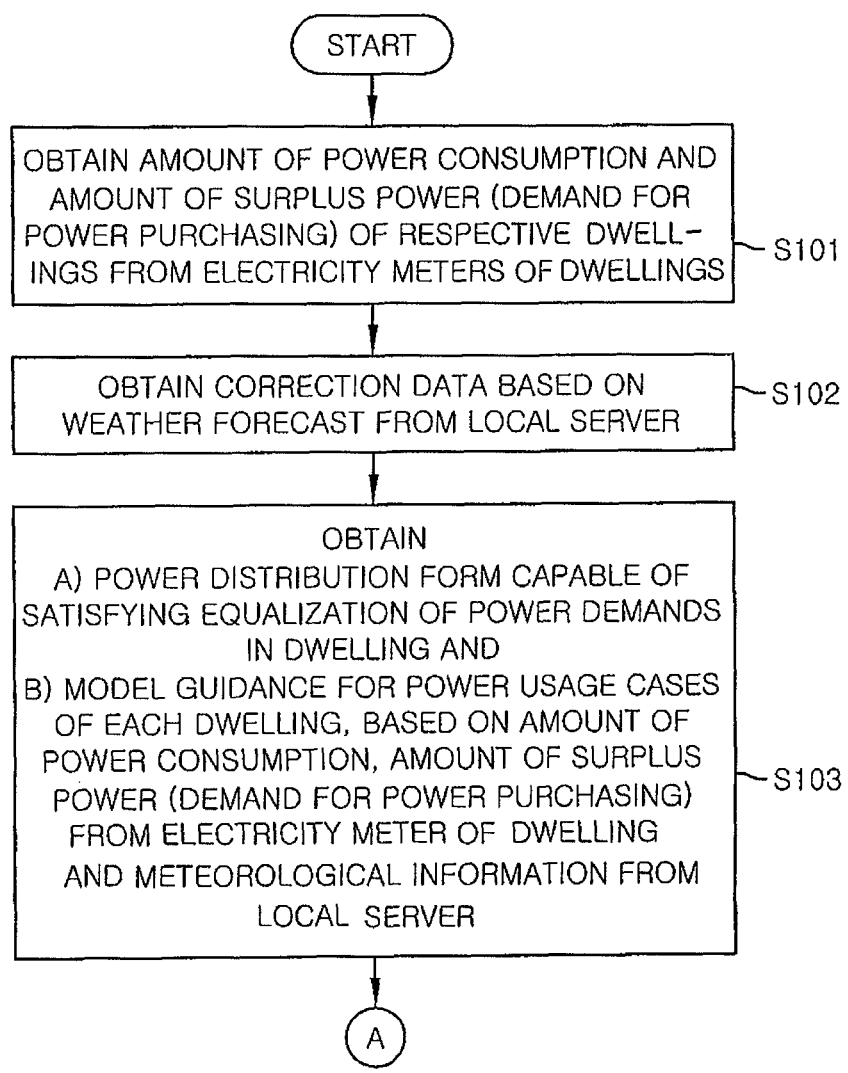
FIGS. 7A and 7B present a flowchart showing a sequence of power distribution by a sub-management server in accordance with the embodiment of the present invention.
Figure 7B:
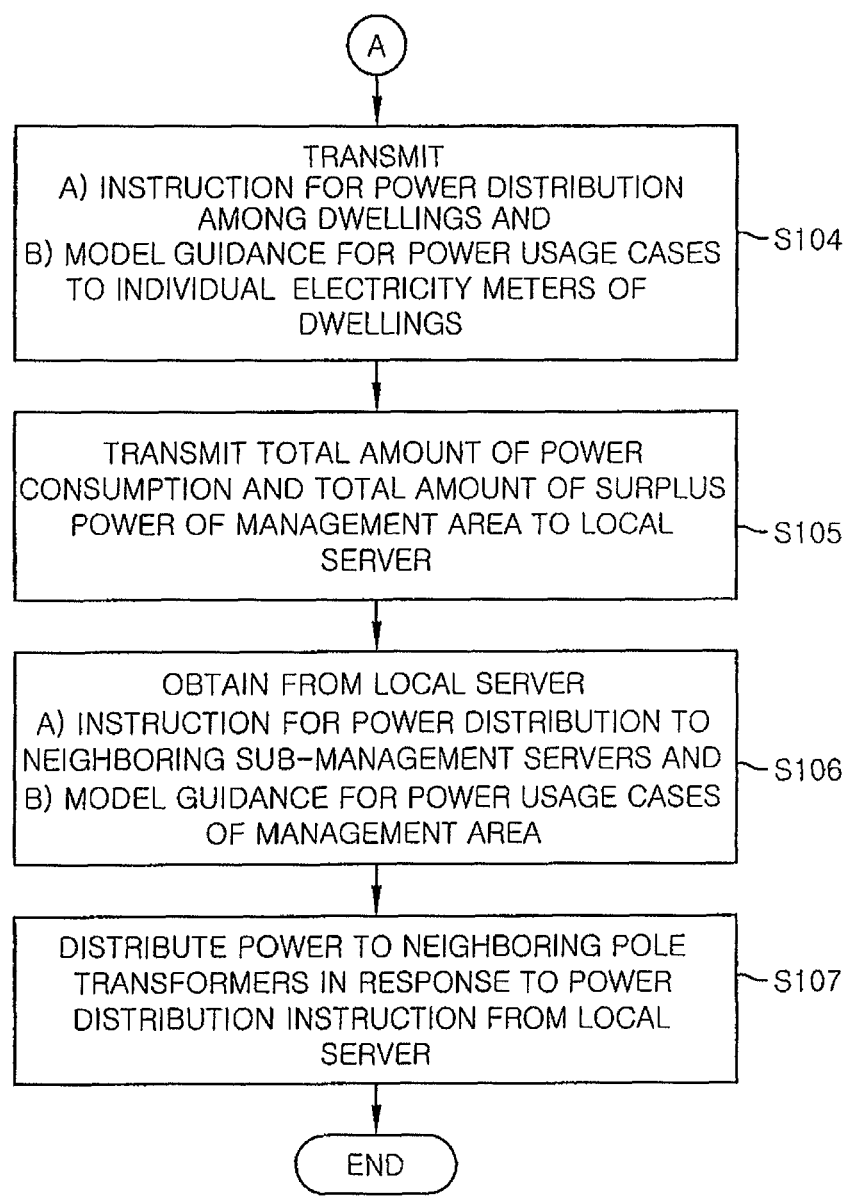

As shown in FIGS. 7A and 7B, the sub-management server 51 obtains, through power line communications, power information including the amount of power consumption, the amount of a surplus power, and the amount of a deficient power, from respective electricity meters 29 provided in dwellings assigned as targets to be managed by the sub-management server 51 in step S101. Then, correction data, which has been acquired by the center server 53 based on a weather forecast, is obtained via the local server 52 in step S102.

Once various types of power information of respective dwellings and the correction data based on the weather forecast have been obtained in this way, a) a power distribution form for satisfying the equalization of power demands in respective dwellings 56, and b) model guidance for power usage cases of each dwelling 56, are individually obtained based on the various types of power information and the correction data in step S103. Further, b) the model guidance for power usage cases of each dwelling 56 may be obtained by any of the sub-management server 51, the local server 52, and the center server 53, but, in the present embodiment, it is calculated by the sub-management server 51.

Next, a) the power distribution form for satisfying the equalization of power demands among the dwellings 56 and b) the model guidance for power usage cases of each dwelling 56, which have been obtained as described above, are transmitted to the electricity meters 29 of the respective dwellings 56 and are then provided to the residents of the dwellings 56a to 56e via the reporting unit 42 in step S104. Further, the distribution of surplus power among the dwellings 56 is performed in response to the power distribution instruction from the sub-management server 51, and then self-satisfaction for the power demands among the dwellings 56 is achieved via such power distribution.

In this way, once power distribution among the dwellings has been performed, various types of power information, such as the total amount of the power consumption and the total amount of the surplus power of the area managed by the sub-management server 51, a balance based on the total amount of power consumption and the total amount of surplus power, and the amount of deficient power in the area, are transmitted to the local server 52 at the higher level in step S105.

Further, a) an instruction for power distribution to neighboring sub-management servers 51 and b) model guidance for power usage cases for the management area, which are obtained based on the various types of power information or the correction data based on the weather forecast, are obtained from the local server 52 in step S106. In this way, each sub-management server 51 performs power distribution among the pole transformers 55 managed by each sub-management server 51 in response to the power distribution instruction from the local server 52 and achieves self-satisfaction for power demands among the pole transformers 55 present in the area managed by the local server 52 in step S107.

Figure 8A:
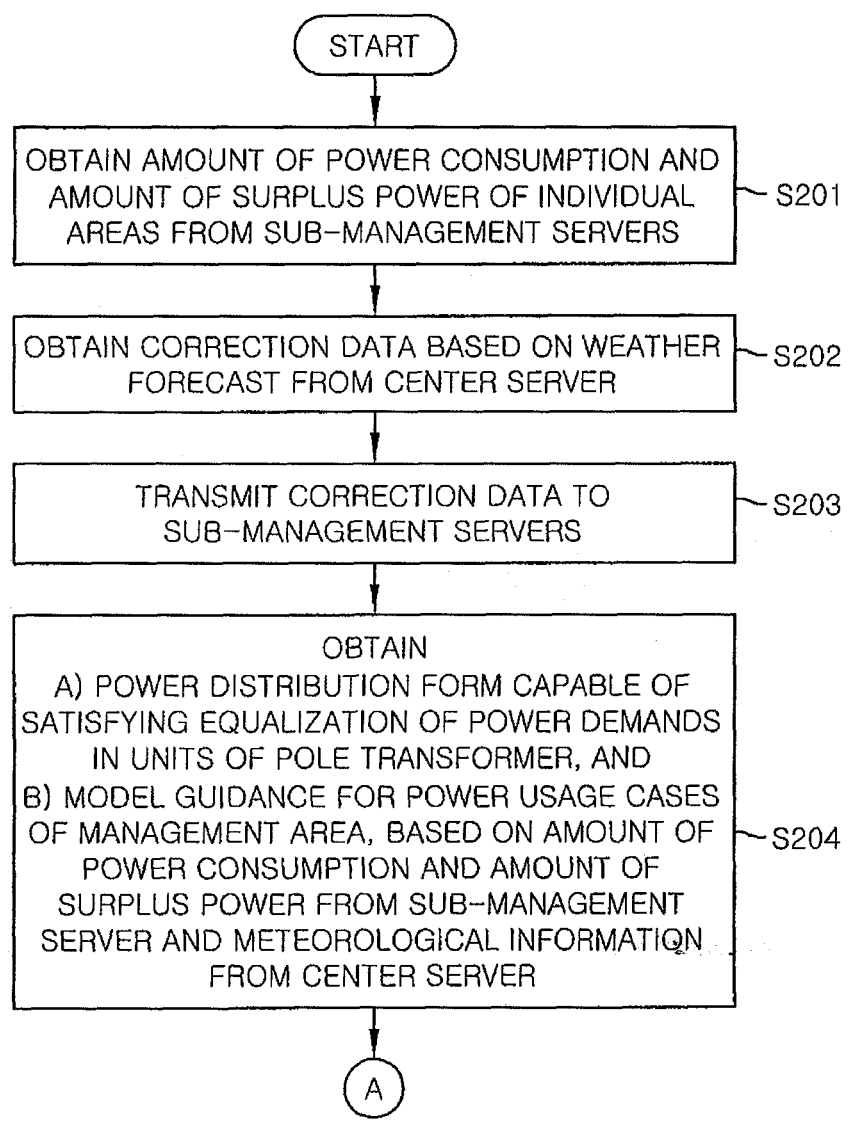
FIGS. 8A and 8B show a flowchart showing a sequence of power distribution by a local server in accordance with the embodiment of the present invention.
Figure 8B:
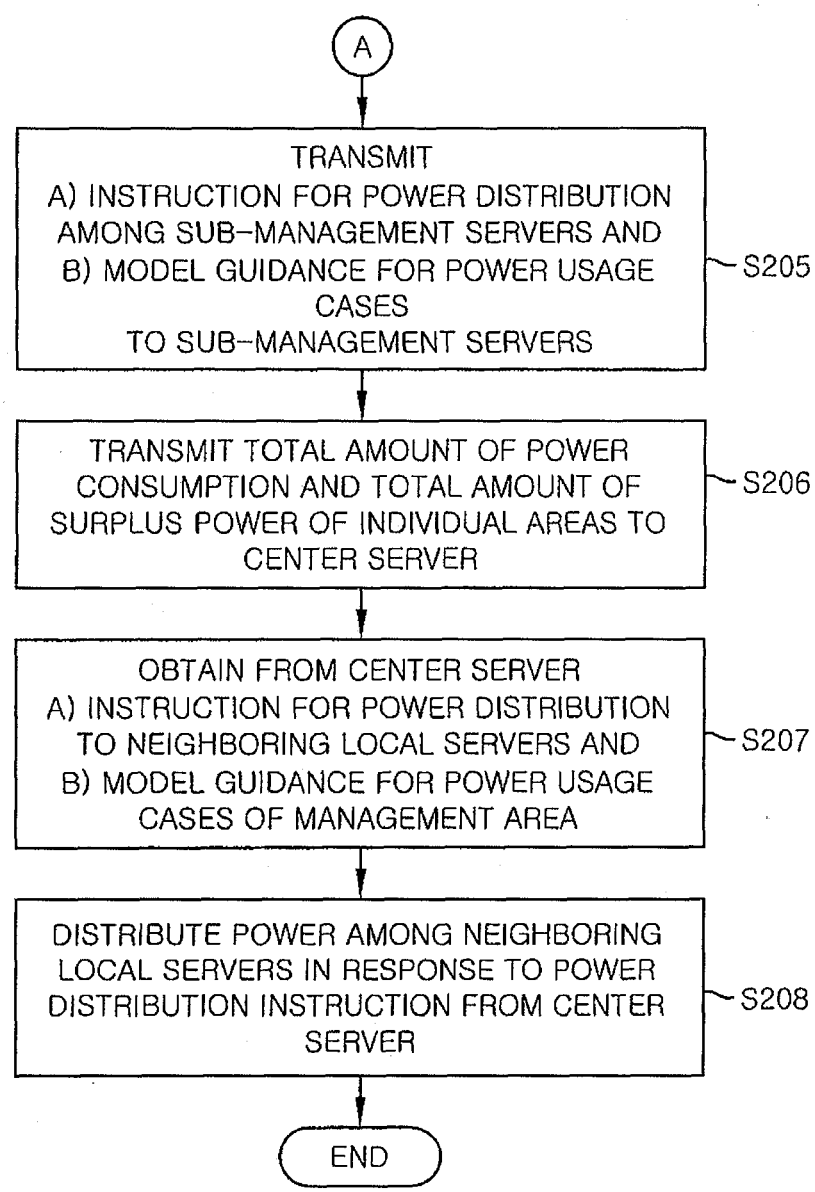

Further, as shown in FIGS. 8A and 8B, the local server 52 for managing the individual sub-management servers 51 obtains, through the power line communications, power information including the amounts of power consumption, the amounts of surplus power, and the amounts of deficient power of respective pole transformers 55, from the sub-management servers 51a to 51d, each of managing pole transformers 55 belonging to an area assigned to the local server 52 as a target to be managed in step S201. Then, correction data, which has been acquired by the center server 53 based on a weather forecast, is transmitted to the individual sub-management servers 51 at the lower level of the local server 52 in steps S202 and S203.

In this way, once the various types of power information on the area managed by the local server 52 and the correction information based on the weather forecast have been obtained, a) a power distribution form for satisfying the equalization of power demands on the basis of the pole transformer 55, and b) model guidance for power usage cases of the management area, are individually obtained based on the various types of power information and the correction data in step S204. Further, b) the model guidance for power usage cases for the management area may be obtained by any of the local server 52 and the center server 53.

Next, a) the power distribution form for satisfying the equalization of power demands on the basis of each pole transformer 55 and b) the model guidance of power usage cases for the management area, which have been obtained in this way, are transmitted to the individual sub-management servers 51 at the level lower than that of the local server 52 in step S205. Further, the distribution of the surplus power among the pole transformers 55 is performed in response to a power distribution instruction from the local server 52, and the self-satisfaction for power demands among the pole transformers 55 in the area managed by each local server 52 is achieved via such power distribution.

Once the power distribution among the pole transformers 55 has been performed in this way, various types of power information including the total amount of power consumption and the total amount of surplus power of the area managed by the local server 52, a balance based on the total amount of the power consumption and the total amount of the surplus power, and the amount of deficient power in the area, are transmitted to the center server 53 at the higher level in step S206.

Further, a) an instruction for power distribution to neighboring local servers 52 and b) model guidance for the power usage cases of the management area, which are acquired based on the various types of power information or the correction data based on the weather forecast, are obtained from the center server 53 in step S207. In this way, each local server 52 performs power distribution among the areas managed by the local servers 52 in response to the power distribution instruction from the center server 53 and achieves self-satisfaction for power demands among the areas to which the power supply destinations are assigned in step S208.

Further, as shown in FIG. 9, the center server 53 for managing the local servers 52 acquires meteorological information on a weather forecast for each area including rainfall probability, an amount of solar radiation, an amount of clouds, a temperature, and humidity, from an information institution such as a meteorological administration in step S301. In this way, once the meteorological information on each area has been obtained, various types of power information including the amount of power consumption, the amount of surplus power, and the amount of deficient power for each area, are obtained from the individual local servers 52, each managing the supply of power of an area assigned thereto instep S302.

When the meteorological information and various types of power information for each area have been obtained as described above, a) a power distribution form for satisfying the equalization of power demands in each area, b) model guidance for power usage cases, c) an optimal mixture form of various types of power generation, and d) a correction value based on the weather forecast, are individually obtained based on the meteorological information and the various types of power information in step S303.

Further, an instruction for surplus power distribution among the areas managed by the local servers 52 is transmitted to the individual local servers 52, the instruction being on the basis of a) the power distribution form for satisfying the equalization of power demands in each area, and then the distribution of the surplus power among the areas managed by the local servers 52 is performed. Accordingly, self-satisfaction for power demands among the areas managed by the local servers 52 is achieved. Further, b) the guidance for model cases of power usage and d) the correction value based on the weather forecast are transmitted to the individual local servers 52 through the power line communications in step S304.

When the various types of information have been transmitted from the center server 53 to the local servers 52, the calculated c) optimal mixture form of the various types of power generation is transmitted to the power supply facility in step S305.

As described above, in accordance with the power distribution system in the present embodiment, the following advantages can be obtained:

(1) The power consumption amount information and the surplus power amount information of the respective dwellings 56, which have been collected by the electricity meters 29 provided in the respective dwellings 56 as power supply destinations, are collected by stages in the servers 51 to 53, and power distribution is performed among the dwellings 56 or among the areas in line with the relationship between the power amounts based on the collected power consumption amount information and the surplus power amount information. Accordingly, the excess or deficiency of a power are resolved for each supply destination through the distribution of the surplus power among the dwellings 56 or the areas that are managed by the servers 51 to 53. Accordingly, self-satisfaction for power demands among the power supply destinations is achieved.

(2) As communication means for transmitting or receiving various types of power information including the power consumption amount information and the surplus power amount information, power line communications using a power line as a medium is employed. Accordingly, in the power distribution among the dwellings or areas, there is no need to provide a separate communications path for remotely measuring the power consumption amount information or the surplus power amount information. Further it is possible to construct a private network by using an existing wiring path. Furthermore, by employing power line communications as the communication means, paths for supplying a power to individual supply destinations can be integrated with communication paths for various types of power information, and the management of the supplied power and the various types of power information becomes easy.

(3) Power distribution among individual supply destinations is performed depending on the balance between the amount of power consumption and the amount of surplus power of each power supply destination. Accordingly, self-satisfaction for power demands in each supply destination is achieved by means of power distribution among the power supply destinations, while the equalization of power demands in each supply destination is accomplished, and furthermore, power distribution among the supply destinations can be suitably performed.

(4) An optimal mixture form of power generation sources viewed from various aspects such as stability, economic efficiency, or environmental efficiency of various types of a power generated from thermal power generation, hydroelectric power generation, nuclear power generation or the like is calculated based on the power consumption amount information and the surplus power amount information collected in the center server 53. The calculated optimal mixture form is fed back to the power supply facility. Accordingly, the power supply facility can select a more preferable power generation sources or calculate the amount of power generated by each power generation source, based on a power demand in which the amount of power consumption and the amount of surplus power in each power supply destination are taken into consideration, and can also efficiently supply power to the supply destination.

(5) In the optimal mixture form of various types of power generation, a reduction in the discharge of carbon dioxide is taken into consideration. Accordingly, the environmental efficiency in the power supply can be improved when the power supply facility generates a power based on the optimal mixture form.

(6) In an optimal mixture form of various types of power generation, a reduction in power generation cost is taken into consideration. Accordingly, the economic efficiency of power supply can be further improved when the power supply facility generates power based on the optimal mixture form.

(7) On the basis of the power consumption amount information and the surplus power amount information collected in the sub-management servers 51, the local servers 52, and the center server 53, information required to improve power utilization efficiency such as power usage pattern models or power selling pattern models is obtained and the obtained information is reported to the residents of the dwellings 56 via the reporting unit 42. Accordingly, the power utilization efficiency is improved through the guidance of power usage forms based on the patterns of the amount of power consumption or the patterns of the amount of surplus power of individual dwellings 56 or the like.

(8) The meteorological information on each area is received from an information institution, such as the meteorological administration and is applied to the center server 53, and the distribution form of power distribution among the supply destinations is corrected based on the meteorological information. Accordingly, there can be performed suitable power distribution depending on meteorological conditions that can influence the amount of power consumption or the amount of surplus power of each supply destination when performing power distribution among the supply destinations.

(9) The management servers are configured with a plurality of servers formed in a hierarchical structure in which functions are assigned to respective levels. Power consumption amount information and surplus power amount information measured by the electricity meters 29 provided in respective supply destinations are collected in sub-management servers 51 at the lowermost level of the hierarchical structure. Accordingly, the power consumption amount information and the surplus power amount information of the power supply destinations are collected in stages, and are managed on the basis of groups (areas) which become larger by stages, and power distribution among the groups (areas) can be performed. Therefore, upon performing power distribution among the supply destinations, self-satisfaction for power demands is sequentially achieved over the range of units from a micro unit such as neighboring dwellings 56 to a business office unit of an electric power company, and to a macro unit such as a single area, e.g., a district.

(10) As the lowermost server of the hierarchical servers, each sub-management server 51 is installed on the pole transformer 55, and the power consumption amount information and the surplus power amount information of dwellings supplied with a power from the pole transformer 55, or the power distribution of the dwellings, are managed by the sub-management server 51. Accordingly, micro-power distribution can be performed among five to ten dwellings as each unit that is supplied with power from the pole transformer 55, and power transmission loss is suitably reduced when power distribution is performed. Further, when the sub-management server 51 is installed on the pole transformer 55, management is facilitated while the supply of power to the dwellings 56 and the power consumption amount information and the surplus power information of the dwellings 56 are collectively managed by the sub-management server 51.

(11) The local server 52 for managing the supply of power to each area to which individual supply destinations are allocated is installed as a server at the level higher than that of the sub-management server 51, so that power distribution among the supply destinations is performed on the basis of the area. This allows not only power distribution among the pole transformers 55 located at the level lower than that of the local server 52, but also power distribution among areas, each of which is a group of pole transformers 55, to be performed. Accordingly, self-satisfaction for power demands among the areas to which the supply destinations are assigned can be achieved.

Further, the embodiment of the present invention may also be performed in the following forms.

A distribution form of power distribution among the supply destinations is corrected based on meteorological information. The distribution form is not limited to this form, and environmental information may correct a distribution form of power distribution among the supply destinations. The environmental information may include political factors such as power regulation or the like. Further, the environmental information required to correct the distribution form of power distribution among the supply destinations may be, but is not limited to, information for influencing the amount of power consumption or the amount of surplus power of each supply destination. In addition, in the case where power is distributed among the supply destinations in line with the relationship between the power amounts based on the amount of power consumption and the amount of surplus power of each supply destination, it is possible to omit correcting the distribution form of power distribution based on the environmental information.

There is provided the reporting unit 42 which obtains the information required to improve the power utilization efficiency of supply destinations to be managed from the servers 51 to 53 and which guides the information. The information may be obtained only by the center server 53 at the uppermost level, and it is optionally determined which of the servers 51 to 53 is to be used to obtained information required to improve the power utilization efficiency of the supply destinations. Further, in the case where power distribution among the supply destinations is performed in line with the relationship between the power amounts based on the amount of power consumption and the amount of surplus power of each supply destination, the reporting unit 42 for calculating information required to improve power utilization efficiency and providing guidance of the information may be omitted.

In the calculation of the optimal mixture form of various types of power generation, a reduction in the discharge of carbon dioxide and a reduction in power generation cost are taken into consideration. The optimal mixture form is not limited to this, and only a reduction in the discharge of carbon dioxide may be taken into consideration in the calculation of the optimal mixture form for the various types of power generation when environmental efficiency is regarded as an important factor. Further, only a reduction in power generation cost may be taken into consideration in the calculation of the optimal mixture form for the various types of power generation when economic efficiency is regarded as important. In addition, in the calculation of the optimal mixture form for the various types of power generation, any one of various aspects such as stability, economic efficiency, and environmental efficiency for the various types of power generation may be taken into consideration to calculate the optimal mixture form.

Further, in the case where power distribution among the supply destinations is performed in line with the relationship between the power amounts based on the amount of power consumption and the amount of surplus power of each supply destination, the calculation of the optimal mixture form for the various types of power generation, which has been performed by the center server 53, may be omitted.

The supply destination of the surplus power is defined as a supply destination requiring the supply of surplus power on the basis of the power consumption amount information and the surplus power amount information of each supply destination. The supply destination is not limited thereto, and a surplus power may be primarily distributed to a supply destination, which is previously determined, among the supply destinations. Accordingly, the distribution of power among the supply destinations can be precisely and easily performed.

Further, when a supply destination having a small change in power consumption is designated as a supply destination that can be previously determined, a power required by the supply destination can be predicted with high precision. Accordingly, sufficient surplus powers can be distributed and supplied to supply destinations requiring a surplus power. In addition, the distribution of a power among the supply destinations can be performed with high reliability.

Further, when a supply destination having a small change in power consumption and having a fixed time period in power consumption is designated as the supply destination that can be previously determined, a power required by the supply destination can be detected with high precision.

Accordingly, sufficient surplus powers can be distributed and supplied to supply destinations requiring surplus power. In addition, the distribution of power among the supply destinations can be performed with high reliability.

Moreover, an electrically driving system of a public institution, such as a streetlight, an incinerator or the like, may be designated as a supply destination having a small change in power consumption, or as a supply destination having a small change in power consumption and a fixed time period in power consumption. In general, the electrically driving system of the public institution has a small change in power consumption caused by the driving thereof and is driven during a limited time period. As a result, the electrically driving system of the public institution is previously designated as the supply destination of the surplus power, so that a sufficient power can be precisely supplied to the electrically driven system of the public institution during the required time period.

Further, an antitheft security system installed in a building may be designated as a supply destination having a small change in power consumption, or as a supply destination having a small change in power consumption and a fixed time period in power consumption. Even in the case of the security system, the amount of surplus power required, or a time span requiring the surplus power, can be predicted with high precision, so that it is possible to accurately distribute and supply a sufficient power to the security system during the required time period.

In addition, in regard to the designation of the supply destination of the surplus power, changes in power consumption amount information and surplus power amount information collected in the sub-management servers 51, the local servers 52, and the center server 53 are learned, and the surplus power may be distributed to a supply destination expected to experience a deficiency of power on the basis of the learned changes in power consumption amount information and surplus power amount information.

In this case, as a supply destination having power deficiency can be predicted in advance, power distribution can be definitely performed before the power deficiency occurs on the supply destination, and thus, the power deficiency can be prevented.

In the above configuration, the surplus power of each dwelling 56 is distributed and supplied to each supply destination.

Figure 10:
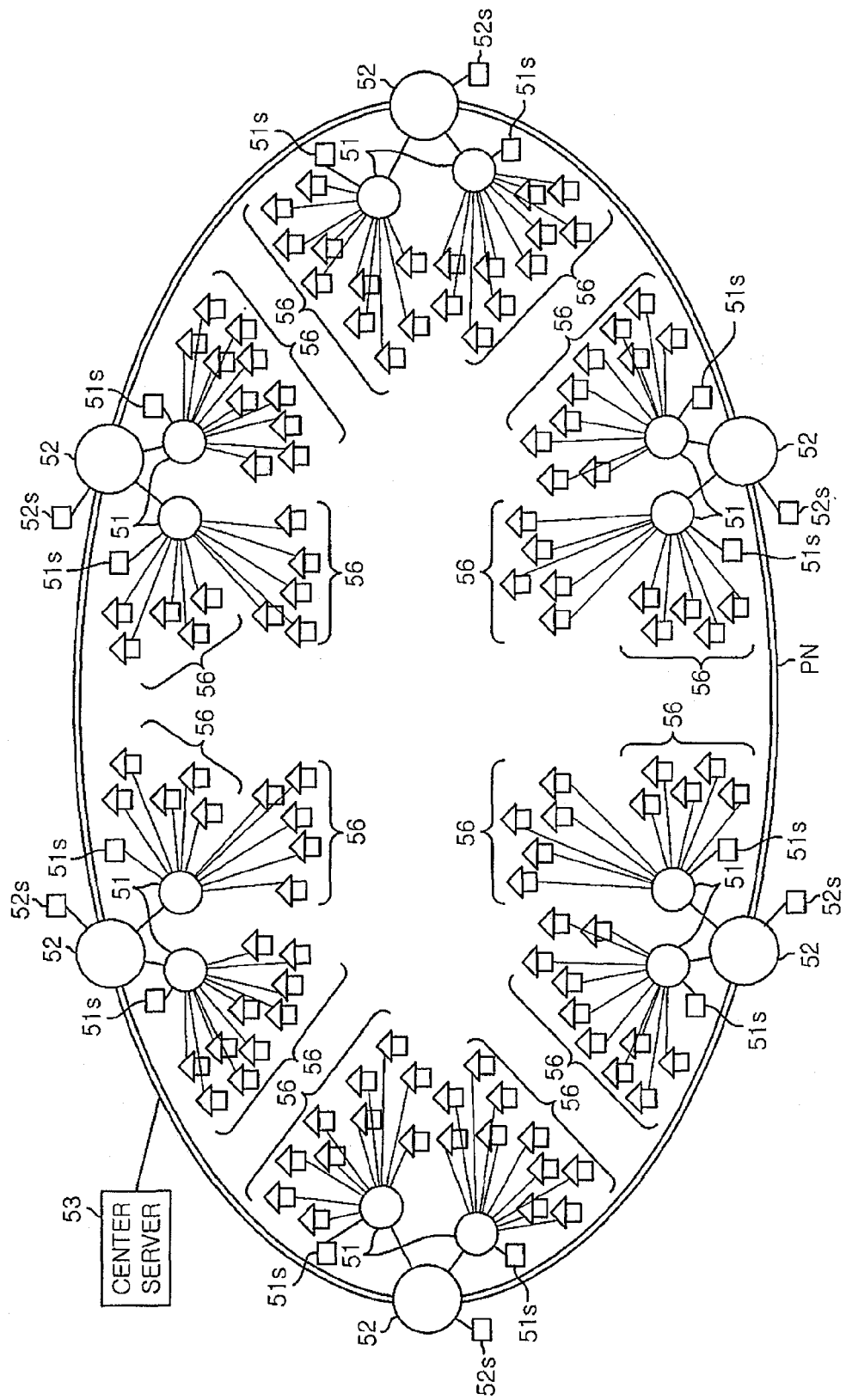
FIG. 10 is a diagram illustrating the system configuration of another embodiment of the power distribution system according to the present invention.

Configuration is not limited thereto, and as shown in FIG. 10, which is a diagram corresponding to FIG. 2, power storage complement equipment 51*s* for storing the surplus power from individual dwellings 56 may be provided in each of pole transformers 55 managed by the sub-management servers 51. Further, a power storage complement equipment 52*s* for storing the surplus power from each of areas managed by the local servers 52 may be provided in that area. According to the configuration of the power distribution system, surplus powers stored in the power storage complement equipment 51*s* and 52*s* are used to distribute a power among the pole transformers 55 and among the areas, thus complementing the power distribution among the power supply destinations is more securely improved.

As a place in which the power supply system 1 is installed, a dwelling 56 has been described by way of example, but the place is not limited thereto, and the power supply system 1 may be installed in a multi-family house, an apartment, an office, a factory or the like.

Further, a dwelling 56 or the like provided with the power supply system 1 has been given as the power supply destination, but a factory or facility unequipped with a power generation device such as the solar cell 3, the storage battery 16 or the like may be used as the supply destination to which the surplus power is distributed. In brief, as long as a power is distributed depending on the amount of power consumption and the amount of surplus power among the supply destinations, the present invention can be applied to such power distribution.

Power distribution by the servers 51 to 53 is performed depending on a balance between the power amounts based the power consumption amount information and the surplus power amount information collected in the servers. The present invention is not limited thereto, and power distribution among the supply destinations may be performed in line with a relationship between the power amounts based on the power consumption amount information and the surplus power amount information of each supply destination, but power distribution is not limited thereto.

The communication means is implemented as power line communications using a power line as a medium. The communication means is not limited thereto, and network communications using the Internet as a medium may be employed as the communication means. In this case, network communications having higher generality can be constructed, and the range of application thereof can be extended when the amount of power consumption and the amount of surplus power of each supply destination are collected in the management server by the remote electricity monitoring device.

In addition, the communication means can also be configured using various types of wireless communication such as UWB (Ultra Wide Band), WILAN (WIreless Local Area Network), specific low-power wireless communications, or Zigbee. In brief, any means capable of transmitting the power consumption amount information and the surplus power amount information that are information measured by electricity meters 29 to the sub-management servers 51 can be used.

Each local server 52 for managing the supply of power to an area to which supply destinations are assigned is installed as the server at the level higher than that of the sub-management server 51, so that power distribution among the supply destinations has been performed on the basis of the area. The present invention is not limited thereto, and it is possible to omit the local servers 52, to directly collect the power consumption amount information and the surplus power amount information, which have been collected in the sub-management servers 51, in the center server 53 and to perform power distribution to the supply destinations through power distribution only among the pole transformers 55.

Further, in the above configuration, the sub-management servers 51 at the lowermost level, among multiple servers formed in a hierarchical structure, are installed on the pole transformers 55, so that power distribution is performed in the units of a group of supply destinations to which power is supplied by the pole transformers 55. The present invention is not limited thereto, and the unit of supply destinations managed by the server at the lowermost level of the hierarchical structure may be two adjacent supply destinations or several tens to several hundreds of supply destinations that have been assigned.

The management servers includes multiple servers implemented in a hierarchical structure, in which functions are assigned to corresponding levels, and power consumption amount information and surplus power amount information measured by the electricity meters 29 are collected in the servers at the lowermost level of the hierarchical structure. The present invention is not limited thereto, and the management server may include only the center server 53, so that the power consumption amount information and the surplus power amount information measured by the electricity meters 29 may be directly collected in the center server 53.

While the invention has been shown and described with respect to the embodiments, it will be understood by those skilled in the art that various changes and modification may be made without departing from the scope of the invention as defined in the following claims.

What is claimed is:

1. A power distribution system comprising:
a remote electricity monitoring device which is provided in each of supply destinations of a power for remotely measuring an amount of power consumption of each supply destination and an amount of a surplus power stored in a corresponding storage battery for storing surplus power at each supply destination via communication means; and
a management server for managing supply of the power to each supply destination while collecting power consumption amount information and surplus power amount information, which are information obtained by the remote electricity monitoring device, via the communication means,
wherein the management server distributes the power among the supply destinations in line with a relationship between power amounts based on the power consumption amount information and the surplus power amount information that have been collected
wherein the management server includes a plurality of servers implemented in a hierarchical structure in which functions are assigned to corresponding levels, the remote electricity monitoring device installed in each of the supply destinations is connected to a relevant server at a lowermost level among the hierarchical servers via the communication means, and the power consumption amount information and the surplus power amount information, which are information obtained by the remote electricity monitoring device, are collected in the server at the lowermost level, so that whenever a power distribution by a lower-level server is in a predetermined situation, targets for the power distribution are sequentially changed to supply destinations managed by the server at a higher level.

2. The power distribution system of claim 1, wherein the communication means employs power line communications using a power line as a medium.

3. The power distribution system of claim 1, wherein the communication means employs network communications using Internet as a medium.

4. The power distribution system of claim 1, wherein the management server performs power distribution among the supply destinations depending on a balance of power amounts based on the power consumption amount information and the surplus power amount information.

5. The power distribution system of claim 1, wherein the management server distributes the surplus power to a supply destination expected to experience power deficiency, based on changes in the power consumption amount information and the surplus power amount information.

6. The power distribution system of claim 1, wherein the management server primarily distributes the surplus power to a supply destination that is previously determined among the supply destinations.

7. The power distribution system of claim 6, wherein the supply destination that is previously determined is a supply destination having a fixed power consumption.

8. The power distribution system of claim 6, wherein the supply destination that is previously determined is a supply destination having a fixed power consumption and having a fixed period of time in power consumption.

9. The power distribution system of claim 7, wherein the supply destination is an electrically driving system of a public institution.

10. The power distribution system of claim 7, wherein the supply destination is an antitheft security system provided in a building.

11. The power distribution system of claim 1, wherein the management server further includes a function of calculating an optimal mixture form of various types of power generation in a power supply facility, based on the power consumption amount information and the surplus power amount information, and feeds back the calculated optimal mixture form of the various types of the power generation to the power supply facility.

12. The power distribution system of claim 11, wherein a reduction in discharge of carbon dioxide is taken into consideration in the calculation of the optimal mixture form of the various types of the power generation.

13. The power distribution system of claim 11, wherein a reduction in power generation cost is taken into consideration in the calculation of the optimal mixture form of the various types of the power generation.

14. The power distribution system of claim 1, wherein the management server further includes a function of obtaining information required to improve power utilization efficiency of each supply destination, based on the power consumption amount information and the surplus power amount information, and providing guidance of the obtained information via the communication means, and each supply destination further includes a reporting unit for reporting the guidance through the remote electricity monitoring device.

15. The power distribution system of claim 1, wherein the management server further includes a function of receiving environmental information including meteorological information via the communication means and correcting a distribution form of the power distribution based on the received environmental information.

16. The power distribution system of claim 1, wherein the predetermined situation includes a limitation caused in the power distribution by the lower-level server.

17. The power distribution system of claim 16, wherein the server at the lowermost level is a sub-management server and is installed at a pole transformer.

18. The power distribution system of claim 17, wherein a local server for managing supply of the power to an area to which the supply destinations are assigned is installed as a server at a level higher than that of the sub-management server installed at the pole transformer, and the power distribution among the supply destinations is performed in units of the area.

19. The power distribution system of claim 8, wherein the supply destination is an electrically driving system of a public institution.

20. The power distribution system of claim 8, wherein the supply destination is an antitheft security system provided in a building.

* * * * *